US012569870B2

(12) United States Patent
Fideler et al.

(10) Patent No.: US 12,569,870 B2
(45) Date of Patent: Mar. 10, 2026

(54) METHOD FOR CONTROLLING A PAINT MIXING DEVICE AND/OR A PAINT APPLICATION DEVICE

(71) Applicant: J. WAGNER GmbH, Markdorf (DE)

(72) Inventors: Brian Lee Fideler, Jordan, MN (US); Jeshwanth Kundem, Minneapolis, MN (US); Joseph W. Kieffer, Chanhassen, MN (US); Jonathan Beaton, Eden Prairie, MN (US); Mujo Taletovic, Friedrichshafen (DE); Thomas Jeltsch, Friedrichshafen (DE)

(73) Assignee: J. WAGNER GmbH, Markdorf (DE)

( * ) Notice: Subject to any disclaimer, the term of this patent is extended or adjusted under 35 U.S.C. 154(b) by 663 days.

(21) Appl. No.: 17/998,062

(22) PCT Filed: May 7, 2021

(86) PCT No.: PCT/EP2021/062107
§ 371 (c)(1),
(2) Date: Nov. 7, 2022

(87) PCT Pub. No.: WO2021/224447
PCT Pub. Date: Nov. 11, 2021

(65) Prior Publication Data
US 2023/0173522 A1     Jun. 8, 2023

(30) Foreign Application Priority Data
May 7, 2020     (DE) .......................... 102020112431.7

(51) Int. Cl.
*B05B 12/12*          (2006.01)
*G06F 3/04815*     (2022.01)
*G06T 19/00*       (2011.01)

(52) U.S. Cl.
CPC ........ *B05B 12/122* (2013.01); *G06F 3/04815* (2013.01); *G06T 19/006* (2013.01)

(58) Field of Classification Search
CPC ... B05B 12/122; B05B 12/00; G06F 3/04815; G06T 19/006
See application file for complete search history.

(56) References Cited

U.S. PATENT DOCUMENTS

| | | | | |
|---|---|---|---|---|
| 5,799,875 | A | * | 9/1998 | Weinstein ............. B05B 7/0815 |
| | | | | 239/296 |
| 11,235,298 | B2 | * | 2/2022 | Saranow ............ G06K 7/10297 |

(Continued)

FOREIGN PATENT DOCUMENTS

| | | |
|---|---|---|
| DE | 102018220405 A1 | 6/2019 |
| DE | 102018220409 A1 | 6/2019 |

(Continued)

OTHER PUBLICATIONS

International Search Report and Written Opinion for International Patent Application No. PCT/EP2021/062107, mailing date of: Jul. 16, 2021, 17 pages with English Translation of the Search Report.

(Continued)

*Primary Examiner* — Michael Collins
(74) *Attorney, Agent, or Firm* — Christopher J. Volkmann; KELLY, HOLT & CHRISTENSON PLLC

(57)     ABSTRACT

A method for controlling a paint mixing device and/or a paint application device, a mobile digital terminal capturing a scene, in particular a project, via an interface for augmented reality, and a virtual coloring and/or material illustration being superimposed on the scene, wherein the virtual coloring is classified according to one or more technical or pre-specified color spaces, and a control statement for a paint mixing device and/or a paint application device is determined from the classification.

20 Claims, 3 Drawing Sheets

(56)     References Cited

U.S. PATENT DOCUMENTS

| | | | |
|---|---|---|---|
| 2009/0248199 A1* | 10/2009 | Milhorn | G06Q 20/20 |
| | | | 705/16 |
| 2012/0072035 A1 | 3/2012 | Nielsen et al. | |
| 2014/0127646 A1* | 5/2014 | Schauffler | G01J 3/526 |
| | | | 427/280 |
| 2015/0344136 A1 | 12/2015 | Dahlstrom | |
| 2017/0215550 A1* | 8/2017 | Walia | A45D 44/005 |
| 2017/0228892 A1* | 8/2017 | Nichol | B65D 83/763 |
| 2018/0093289 A1 | 4/2018 | Raman et al. | |
| 2018/0156663 A1* | 6/2018 | Farley | G01J 3/462 |
| 2019/0151882 A1 | 5/2019 | Tritt et al. | |
| 2021/0065459 A1* | 3/2021 | Wyble | G06F 3/013 |
| 2021/0076807 A1* | 3/2021 | Pack | G07F 9/001 |
| 2022/0400829 A1* | 12/2022 | Mor Yosef | A46B 11/002 |

FOREIGN PATENT DOCUMENTS

| | | | |
|---|---|---|---|
| DE | 102018203569 A1 | 9/2019 | |
| DE | 102018209377 A1 | 12/2019 | |

OTHER PUBLICATIONS

Office Action for German Patent Application No. 102020112431.7 dated Dec. 21, 2020, 6 pages.

English Translation of the International Preliminary Report on Patentability for International Patent Application No. PCT/EP2021/062107, International Filing Date of May 7, 2021, 8 pages.

Office Action for European Application No. 21725092.7, dated Oct. 24, 2023, 2 pages.

* cited by examiner

CLEANING
MODE

METHOD FOR CONTROLLING A PAINT MIXING DEVICE AND/OR A PAINT APPLICATION DEVICE

CROSS-REFERENCES TO RELATED APPLICATIONS

This Application is a Section 371 National Stage Application of International Application No. PCT/EP2021/062107, filed May 7, 2021, and published as WO 2021/224447 A1 on Nov. 11, 2021, and claims priority to German Application No. 102020112431.7, filed May 7, 2020, the contents of both are hereby incorporated by reference in their entirety.

DETAILED DESCRIPTION

Figure 1:
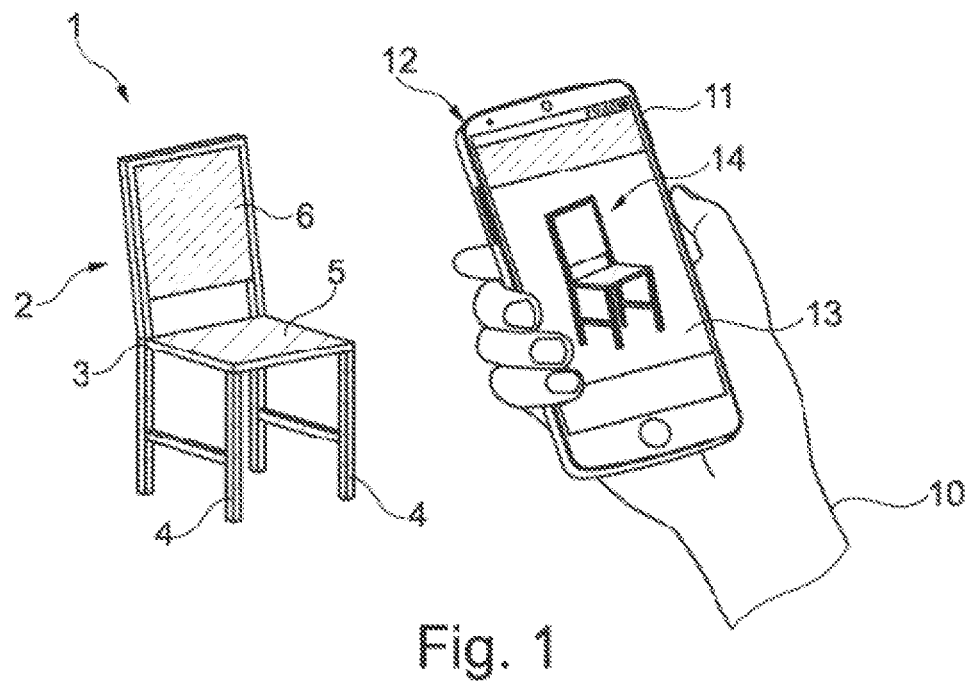
FIG. 1 shows a recording of a scene by means of a smartphone, in one example.

The present disclosure relates to a method for controlling a paint mixing device and/or a paint application device according to the preamble of claim 1. The present disclosure also relates to a paint application device according to the preamble of claim 9 and also to a method for paint mixing according to the preamble of claim 8 and a paint container according to the preamble of claim 16.

In order to provide color for a project, for example in the area of DIY or crafts and trades, methods that are routine in the prior art come into consideration. For example, for this the object is painted in a desired color with a brush or a roller or is coated with paint of the desired color by means of a paint spraying system, for example a paint spray gun.

In the sense of the present disclosure, paint should be understood as meaning the material of the paint itself, usually in liquid form. In the sense of the present disclosure, the color should be understood from here on as meaning the coloring on the basis of the optical wavelength that a viewer perceives.

Both in the area of DIY and in the area of crafts and trades, there is often the problem that objects which are to be provided with a specific color and/or a specific surface appearance only reveal the actual effect of the overall impression once they have been completed. Although, by choosing suitable color charts on paper or card, it is possible beforehand for segments of the desired color to be held against the object concerned in order to assess how the color will affect the overall object, often an incomplete overall impression is obtained, possibly differing from an overall impression of the finished object. If the completed overall impression is not acceptable, there is generally the problem that the entire project has to be reworked, in particular abrasively removed, prepared and worked once again with an adapted color. This entails expenditure in terms of time and cost and moreover often leads to frustration with the performance of the work.

An object of the present disclosure is therefore that of improving the predictability of a result when working on a project, in particular when producing a color on a surface by applying paint and/or producing a specific surface appearance.

This object is achieved by the proposed methods and devices for carrying out the methods concerned.

Advantageous developments and expedient refinements are specified in the dependent claims.

The present disclosure consequently relates to a method for controlling a paint mixing device and/or a paint application device, a mobile digital terminal capturing a scene, in particular a project, for example a workpiece in the form of a piece of furniture or the like, via an interface for augmented reality, and a virtual coloring and/or material illustration being superimposed on the scene. The scene is in this case generally captured by means of a camera or the like and superimposed with a virtually generated image or image section, which may, for example, also be partially transparent. The method then provides that the virtual coloring is classified according to one or more technical or pre-specified color spaces, in particular PANTONE or RAL or the like, and a control statement for a paint mixing device and/or a paint application device is determined from the classification.

The method in this case provides that a mobile digital terminal, for example a smartphone or a tablet computer, captures with its camera the scene that includes the object to be worked. Then, on the principle of so-called augmented reality, software is used to revise the scene, in particular the object to be worked, with a virtual coloring and/or a material illustration. The term coloring takes into account, for example, not only the color but also a specific surface structure in the color, for example a so-called vintage look. The material illustration may, for example, include additional working to reveal wood grain or other working steps.

The method is then used to transfer the virtual coloring, in particular the color stored there, into one or more technical color spaces, such as for example Pantone or RAL, so that a control statement can be generated from this transfer into technical color spaces.

The control statement obtained by the method can then be used for a paint mixing device and/or a paint application device, in order to come as close as possible to the overall impression of the object generated by means of augmented reality, in particular to the extent that it is identical.

In the sense of the present disclosure, a scene is a snapshot of a room with an object or an arrangement of objects, of which individual objects or a group of objects is/are referred to as a project.

In one embodiment of the method, it is provided that the control statement comprises data on an object of the captured scene, in particular project data, preferably data on the surface category, surface geometry, etc., which have been recorded or generated by the mobile terminal.

Supplementing the control statements with additional data about the project makes it possible to obtain an improved evaluation of the control statement in its use in a paint mixing device and/or a paint application device, and, for example, to assign the results specifically to the captured project. For this purpose, in particular when capturing the surface category, for example as wood or metal, and/or the surface geometry, calculations that include the required volume of paint and/or possible effects on the appearance of the color may already be made.

Also, data concerning the application, for example use indoors or outdoors, which can influence the later selection of materials and/or processing, may also be stored.

Preferably, the data concerning the materials and/or the application may also be detected and proposed to the user by artificial intelligence or an evaluation of the scene by the mobile terminal or other computing services.

Moreover, it is possible for the user to perform its own corrections and adaptations to the data, if, for example, a different nature of material or category is to be chosen.

In a further refinement, it is also provided that the interface for virtual reality receives secondary data via a data interface, the secondary data comprising in particular existing colorings and/or existing color spaces and/or stored templates, preferably in the form of photographs or pictures.

This extension of the method offers the possibility of incorporating in the project existing color spaces or color palettes, for example seasonally dictated trends of colors, or interests in an overall impression to be produced that are selected by the user. For example, photographs of desired appearances may be used to provide the user's own project with a similar look, or pre-specified design templates may be offered by the manufacturer and then implemented in the course of its own projects. Moreover, trend-related information, for example seasonal color spaces or in-vogue colors from third-party providers may also be incorporated, in order, for example, to incorporate specific paints available on the market that have colors of an in-vogue color palette. These pre-specified color palettes can also be used to supplement the technical color spaces.

Secondary data may in this case be pre-specified in software, or made available via network connections, for example via the Internet or cloud services.

It is also possible that data of the control statement as a whole or in part are stored on an external medium, in the Internet or a cloud service, or on the device(s) itself/themselves, so that reproducibility at a later time is ensured, if the same color or the like is desired again.

A further embodiment of the method provides that the control statement comprises a mixing process, in particular a composition of a color corresponding to virtual coloring from color components.

On account of the fact that the mobile terminals usually have comparatively high computing capacity and/or high data availability, it is expedient to store the control statement for a mixing process, in particular the composition of a color from available primary colors of a technical color space (Pantone, RAL, etc. . . . ) already in the control statement. In this way it is ensured that no conversion problems arise when the virtual color from the virtual coloring is converted into actual colors or a paint to be mixed.

A further expedient embodiment provides that the control statement comprises a spraying process, in particular a spraying process for producing a specific material illustration, preferably a surface appearance or surface structure or surface coating.

For the aforementioned reasons, when there is high availability of computing power and/or data, for example from the Internet, it may be expedient moreover to provide the control statement already with instructions for a spraying process, which then controls a paint application device, in order to produce a corresponding surface appearance or surface structure, for example a mottling or a smeared effect.

A further variant of the method provides that the control statement comprises a project identification and/or object identification, in particular that the control statement comprises a functional approval for the captured scene for the color application device.

A project identification and/or object identification ensures that the paint produced by means of the control statements in a paint mixing device and/or the function transmitted to a paint application device by means of the control statement is subject to an approval, so that the respective execution of the control statement on the device concerned is only approved when the captured scene, in particular the project concerned, is being worked. This may take place, for example, by a photo or other recording of a scene being taken once again by means of the digital terminal before the final working of the object, and this being compared with the materials and/or devices that are available.

In a further embodiment, it is provided that the control statement comprises spraying control for the paint application device for producing the virtual material illustration on a surface.

It is similarly expedient when there is said high availability of computing power and/or data, for example from the Internet, to provide the control statement already with instructions for controlling the paint application device, in order to produce a desired corresponding material illustration, for example a spraying direction in the direction of the grain of a wood or a matt or gloss impression by corresponding size distribution of the spray mist.

The present disclosure relates moreover to a method for paint mixing in a paint mixing device. In this case, the paint mixing device comprises a plurality of storage containers, the storage containers each being filled with a paint of a base color. Furthermore, the paint mixing device comprises a mixing unit, paints being removed from the storage containers in the mixing unit and mixed to form a paint of a pre-specified color in a pre-specified amount of paint, and this paint being transferred into a removable paint container for mixing and/or after mixing. In this case it is provided that the mixing is performed by a control statement on the basis of the method described above or the described developments of the method.

In the provided method for paint mixing in a paint mixing device, the method described above for determining a control statement and the technical color space stored therein is used as a basis for producing a paint, by multiple storage containers with paints of specific base colors being provided, and a paint which corresponds in color to the coloring of augmented reality being mixed from these colors, in a way corresponding to the control statement and the parameters of the technical color space. Although corresponding mixing processes are known, they are generally not determined in a standardized manner by individually calculated compositions on the basis of coloration in augmented reality for the individual case, but on the basis of pre-specified color charts and/or colors. In the way proposed here, however, it is ensured in the sense of the present disclosure that, with the control statement, a best possible match is achieved, to the extent of an identical color, compared with the captured scene in augmented reality, and consequently the color adapts itself to the wishes of the user, and it is not that the user has to choose a color from an available portfolio of color charts or the like.

The present disclosure relates moreover to a paint application device, in particular a paint spraying device, the paint spraying device comprising a spraying unit and also at least one paint container for storing paint to be sprayed. The present disclosure is characterized in that the paint container is filled with paint, the paint having a color which has been selected by means of a method for controlling a paint spraying device according to the method described above or the described developments of the method, preferably produced by means of a control statement.

The also claimed paint application device, in particular paint spraying device, uses a paint container which contains a paint that is defined by the described method, using a control statement according to the present disclosure. The paint application device is consequently prepared for being used by a user to transform into reality the scene that has been captured by means of augmented reality and prepared, and to coat the object concerned according to specifications, in particular to apply the paint of the desired color.

It is preferably provided in this case that paint containers are formed as single-use containers.

The use of a paint container as a single-use container offers the possibility in this case of mixing the paint in the single-use container itself, and thereby ensuring that no falsification occurs as a result of remains of paint that are possibly contained in a multi-use container.

A development provides in this case that the paint container is formed as a single-use cartridge, the cartridge comprising at least one paint line and also at least one spray head, in particular an atomizer nozzle.

In the sense of the present disclosure, a cartridge comprises a combination of a receiving volume for paint and the required components for spraying the paint, which are referred to hereinafter as the so-called "contamination region". The use of the paint container as a single-use cartridge offers the advantage moreover that cleaning of the contamination region after completion of the project is not required, but instead the complete cartridge can be removed from the paint application device and disposed of.

It is alternatively provided that the paint container is formed as a multi-use container, in particular as a returnable container.

When the paint container is used as a multi-use container, in particular as a returnable container, there is the possibility of passing the paint container on to a professional and reliable cleaning system, so that it is ensured in the event of renewed use that no remains of paint of a color of an earlier project are contained, and as a result no adverse effects can occur in the result of the project.

In this case, a corresponding development may provide that the paint container is formed as a multi-use cartridge, in particular as a returnable cartridge, the multi-use cartridge comprising at least one paint line and also at least one spray head, in particular an atomizer nozzle.

In a way corresponding to the aforementioned advantage of a paint container as a multi-use container and the described use of a cartridge to avoid the cleaning of a spraying system by the user itself, the use of a multi-use cartridge, in particular returnable cartridge, is also advantageous.

An embodiment of the paint application device provides that the paint application device comprises a project identification and/or object identification, in particular a control statement for the paint application device comprises a functional approval for the captured scene.

A project identification and/or object identification, which is realized, for example, by the paint application device itself, or by an interface of the paint application device in relation to a mobile terminal, for example a smartphone, has the effect that a functional approval is only given when the correct paint of the correct color for the correct project is loaded and ready to spray. Quality control, for example ascertaining a storage time since the mixing of the paint and processing parameters that can be derived from that, is also conceivable.

A further refinement provides that the paint application device comprises a spraying control for the paint application device for the actual production of the virtual material illustration on a surface, in particular for controlling the spraying volume and/or for controlling spraying pulses and/or for controlling the spraying pressure and/or for controlling further physical spraying parameters in a way corresponding to the control statement.

The technical control of the paint application device by using particulars from the control statement allows that the control statement generated in the mobile terminal can always be based on the current state of knowledge of the control methods for producing a material illustration and/or a spray pattern. In addition, it can be ensured that the available paint volume of the paint of the desired color is sufficient, and that it is not the case that individual locations on the surface are coated above-average (repeatedly), as result of which the volume of paint is possibly not sufficient for other locations.

It is also provided that the paint application device is a hand-held, in particular a hand-guided, preferably a hand-operated paint application device.

It is advantageous here that flexible and easy use is made possible, which in particular allows use for private applications in the area of DIY or mobile use for crafts and trades. This obviates the need for laborious installation and adjustment of the paint spraying device, for example in the form of automated motif creation, and also the use of trained specialist personnel.

In a further particular embodiment, it is provided that the paint application device comprises a mobile energy source, in particular a rechargeable accumulator or else a battery.

This allows the area of use of the paint application device to be positively increased in size, since it can be used without being tied to a particular location, for example restricted in movement because of power-carrying cables. Specifically in the area of work in crafts and trades or hobbies, unproblematic use of the paint spray device can consequently be made possible for the user, and the latter can put it to use, for example at different locations of his working area, quickly without any additional setting-up time.

A further embodiment provides that the paint application device operates on the basis of the HVLP process for paint application.

The advantages of a flexible paint spraying device for the area of crafts and trades and hobbies can consequently be combined with the advantages of HVLP technology, and mist-reduced spraying with high paint transfer rates can be provided.

With the system in mind, the present disclosure also relates to a paint container for a paint mixing device described above and/or a paint application device described above for carrying out the method described above. In this case it is provided that the paint container comprises a means of identification, in particular a readable or readable and writable means of identification, the means of identification being used for making an assignment to a control statement for a paint mixing device and/or a paint application device.

It is also ensured by the corresponding paint container that there is no confusion with respect to the paint of the desired color that is received in the paint container, and that, for example, with changing colors for similar projects, an incorrect color is not used. Such confusion can lead to problems not only in that, for example, the color does not correspond precisely to the overall impression provided by augmented reality but also that, for example, provided volumes, which may, for example, be different for coating a chair than for coating a table or a bench, are confused with one another. Corresponding problems are avoided by attaching a means of identification together with the control statement and/or data from it.

FIG. 1 specifically shows the recording of a scene 1 of a project 2 in the form of a chair 3, in which the region of the chair legs 4 and the seat area 5 has already been given a specific coloring. The area of the backrest 6 is now intended to be provided with a specific appearance in terms of color and surface as a project 2 to be performed. For this purpose, the scene 1 is captured by a user 10 using a smartphone 11, by means of a camera 12, and shown on the display 13 of the smartphone 11 as a picture 14.

Figure 2:
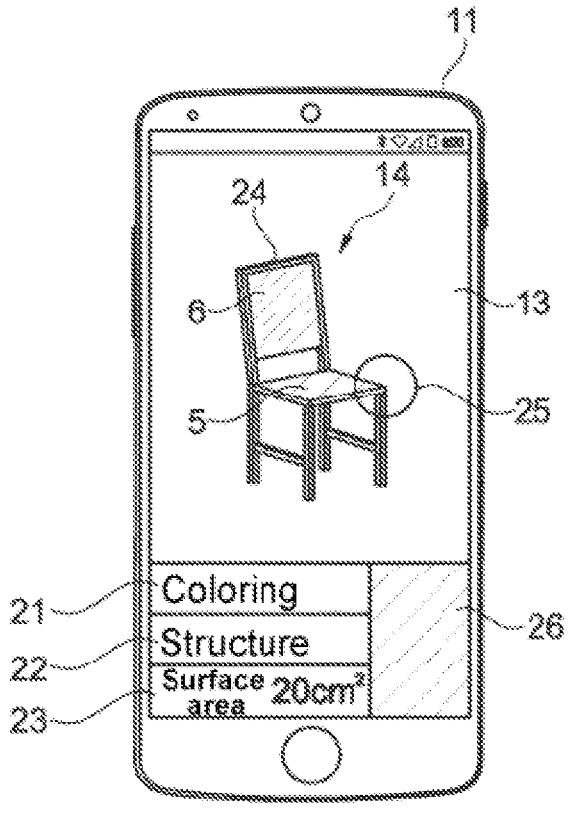
FIG. 2 shows the working of the scene in augmented reality on the smartphone, in one example.

FIG. 2 then shows the working of the scene 1 on the display 13 of the smartphone 11 by using the functionality of augmented reality. In this case, in a first data field 21, for example, the project is given a name. In a second data field 22, a surface appearance, for example a surface structure in the form of a patterning, material impression or mottling or the like, is stipulated. In a third data field 23, the surface area of the backrest 6 that is intended for the working is calculated by including a surrounding border 24 in the picture 14 of the scene. By such a selection, for example with a surrounding border 24, a surface portion or a surface area to be coated can be determined. A selection tool 25 can also be used, for example, for determining the coloring of the seat area 5 and/or the chair legs 4, in order by this means to select a color 26 for the project 2 in the form of the coating of the backrest 6.

After completion of the working in augmented reality on the smartphone 11, the control statement is then created according to the present disclosure, with in particular the color 26 then being transferred into a technical color space, for example Pantone or RAL.

Figures 3, 4:
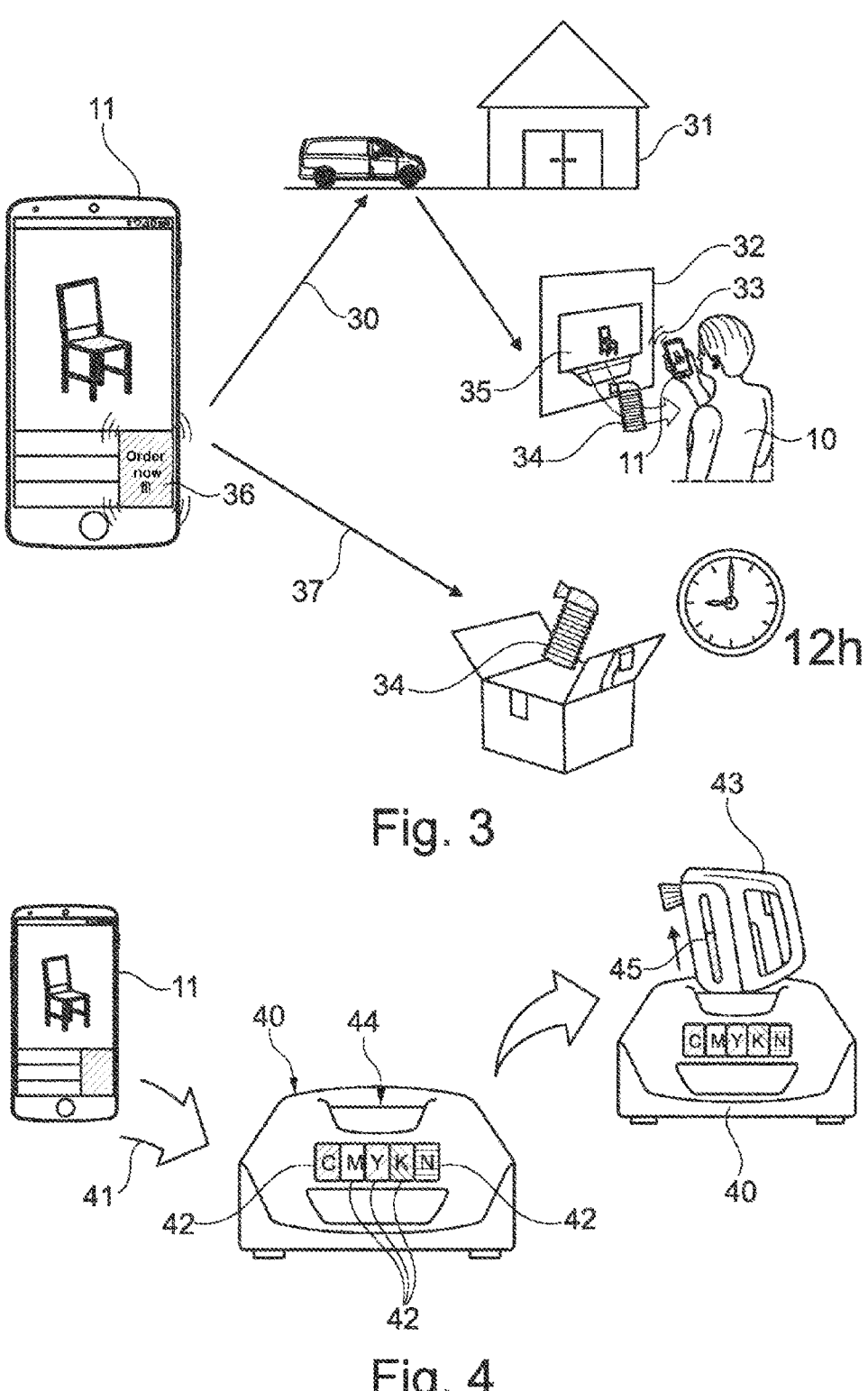
FIG. 3 shows the transfer of the control statements that were generated in the smartphone, in one example.
FIG. 4 shows the use of the control statement in a paint mixing device, in one example.

FIG. 3 then shows the transfer of the control statement from the smartphone 11, on the one hand by a person carrying/transporting 30 the device 11, for example when the user 10 visits a hardware store 31 or a specialist trade outlet. In this case, at an ordering station 32, the user 10 will, for example, transmit the control statement as a whole or in part to a paint mixing device provided in the ordering station 32 by data transmission 33 from the smartphone 11 to the ordering station 32. On the basis of the transmission, a paint container 34 with paint of the desired color is created in the ordering station 32 or by other auxiliary means. The ordering station 32 may comprise inter alia a display 35, on which data on the project that is associated with the control statement are shown. In this way, the user 10 can perform a check before initiating a process for ordering the paint container 34.

Alternatively, the transfer of the control statement may also be initiated as an ordering process 37 from the smartphone 11 by means of corresponding ordering software 36. In this way, an ordering process 37 is used to deliver the paint container 34 to the user by a parcel service, for example in a pre-specified time.

FIG. 4 shows the alternative use of a paint mixing device 40, which receives the control statement via the smartphone 11 and a transmission path 41, for example Bluetooth or WLAN or NFC. The paint mixing device has in this case a receptacle 44 for a paint spraying device 43. The paint mixing device 40 in this case comprises a number of storage containers 42 with paints of different colors (for example primary colors), which are mixed with one another in the paint mixing device 40 to produce the desired paint of the desired color according to the control statement. On the basis of the control statement that has been transmitted via the transmission path 41 from the smartphone 11, the paint mixing device 40 determines the composition in proportions of the paints from the storage containers 42. Then, after introducing the paint spraying device 43 into the receptacle 44 of the paint mixing device 40, this paint can be introduced by the paint mixing device 40 into a paint container 45 provided in the paint spraying device 43. Likewise envisaged, but not shown, is direct introduction into a paint container separate from the paint spraying device or a paint cartridge, which is correspondingly described below in FIG. 5. By performing a mixing process, the paint mixing device will mix the paints that are present in the storage containers 42 to form a paint of the desired color and provide it for further working. The mixing process may, for example, also take place in the paint container itself, for example by introducing and subsequently vibrating or stirring the paint, so that no contamination regions with already mixed primary colors from the storage containers occur in the paint mixing device.

Figure 5:
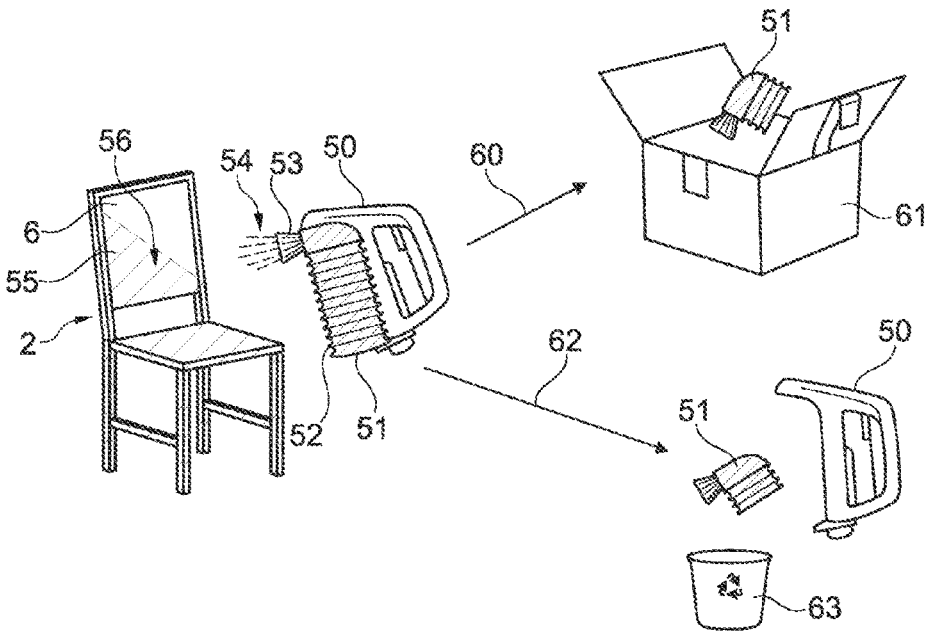
FIG. 5 shows the use of a single-use cartridge, in one example.

FIG. 5 then shows the use of a paint application device, in the present case a paint spraying device 50, with a single-use cartridge 51, as obtained, for example, in the aforementioned FIG. 3 from a trade outlet. The single-use cartridge 51 comprises paint of a desired color for the project 2 in a paint container 52 and can be inserted into the paint spraying device 50. The paint cartridge 51 in this case comprises a paint container 52 and also a paint line (not shown) and the required components for spraying the paint, in particular an atomizer nozzle 53. The paint spraying device 50 is controlled by the control statement in such a way that a paint spray mist 54 for producing a coating of the surface, in the present case the chair backrest 6, in a color 55 is generated. In this case, not only is the control of the paint spraying device 50 for coating the surface of the chair backrest 6 contained in the control statement, but also additional control parameters for producing a specific surface appearance, for example a color transition 56, executed by the paint spraying device 50. After completion of the work, the single-use cartridge 51 may either be returned by mail order 60 in a box 61 to a deposit-refund system, or it is sent to waste 63 via the disposal route 62. The paint spraying device 50 is in this case left without a single-use cartridge 51 and can be used again immediately for subsequent use, without components of the paint spraying device 50 having to be cleaned.

The single-use cartridge 51 is shown in the present case with a compressible paint container 52, which is compressed after removal of the paint, and consequently can be disposed of or returned in a space-saving manner.

Figure 6:
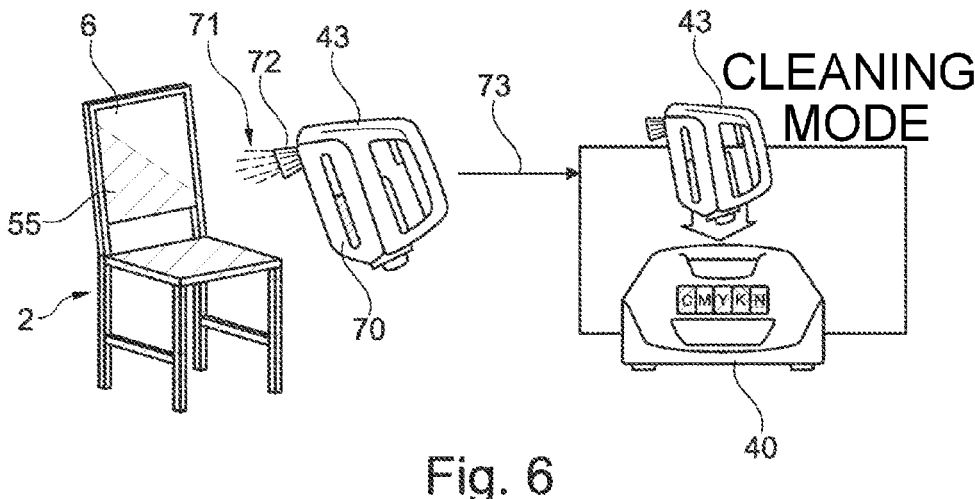
FIG. 6 shows the use of a multi-use cartridge, in particular of a paint application device with a paint mixing device, in one example.

FIG. 6 shows in turn the use of a multi-use cartridge in combination with a paint mixing device 40. In this case, as described in FIG. 4, the paint spraying device 43 has a paint filling of a desired color 70. The paint spraying device 43 then applies the paint of the desired color 55 to the project 2, in particular the chair backrest 6, with a paint spraying mist 71 by means of a paint nozzle 72 that constitutes part of the paint spraying device. After completion of the working of the project 2, the paint spraying device 43 is returned to the paint mixing device 40 in a cleaning step 73. The paint mixing device 40 then performs a cleaning process on the paint spraying device 43, in order to prepare it for mixing in a paint of a new color or topping up the paint container with the existing color, as described above in FIG. 4.

Although the present invention has been described with reference to preferred embodiments, workers skilled in the art will recognize that changes may be made in form and detail without departing from the spirit and scope of the invention.

LIST OF DESIGNATIONS

1 Scene
2 Project
3 Chair
4 Chair legs
5 Seat area
6 Backrest
10 User
11 Smartphone
12 Camera
13 Display
14 Picture
21 First data field
22 Second data field
23 Third data field
24 Surrounding border
25 Selection tool
26 Color
30 Person carrying/transporting the device
31 Hardware store/specialist trade outlet
32 Ordering station
33 Data transmission
34 Paint container
35 Display at ordering station
36 Ordering software
37 Ordering process
40 Paint mixing device
41 Transmission path
42 Storage container
43 Paint application device/paint spraying device
44 Receptacle for a paint spraying device
45 Paint container
50 Paint application device/paint spraying device
51 Single-use cartridge
52 Paint container
53 Atomizer nozzle
54 Paint spraying mist
55 Color
56 Color transition
60 Mail order
61 Box
62 Disposal route
63 Waste
70 Color
71 Paint spraying mist
72 Paint nozzle
73 Cleaning step

The invention claimed is:

1. A method for controlling a paint mixing device, the method comprising:

capturing, with a mobile digital terminal, an image of a scene, the scene including a project object, superimposing, via an interface for augmented reality on the mobile digital terminal, a virtual coloring and/or material illustration of the project object on the image of the scene, classifying the virtual coloring and/or material illustration of the project object according to one or more technical or pre-specified color spaces, and generating a control statement for a paint mixing device to produce a mixed paint based on the classification.

2. The method as claimed in claim 1, wherein the control statement comprises data corresponding to the project object included in the image of the scene, and wherein the data is recorded or generated by the mobile terminal.

3. The method as claimed in claim 2, wherein the mobile digital terminal receives secondary data via a data interface, the secondary data comprising existing colorings and/or existing color spaces and/or stored templates.

4. The method as claimed in claim 1, wherein the control statement comprises a mixing process control statement configured to control the paint mixing device based on a composition of color components of the project object.

5. The method as claimed in claim 1, wherein the control statement comprises a spraying process control statement configured to control a paint application device to perform a spraying process for producing a specific material illustration, wherein the specific material illustration comprises at least one of a surface appearance, a surface structure, or a surface coating.

6. The method as claimed in claim 5, wherein the control statement comprises a project identification and/or object identification, and the control statement comprises a functional approval for the paint application device to perform the spraying process based on the project identification and/or the object identification.

7. The method as claimed in claim 1, and further comprising a paint application device, wherein the control statement further comprises a spraying control statement configured to control the paint application device to apply the mixed paint on a surface.

8. The method as claimed in claim 1, wherein the paint mixing device comprises:

a plurality of storage containers, the storage containers each being filled with a paint of a base color, and a mixing unit, wherein one or more paints are removed from the plurality of storage containers and are mixed in the mixing unit to form the mixed paint, wherein the mixed paint includes a pre-specified color in a pre-specified amount of paint.

9. A paint spraying device comprising:

a mobile digital terminal including a camera configured to capture an image of a scene including a project object;

an augmented reality interface displayed on the mobile digital terminal, wherein the augmented reality interface is configured to display a material illustration of the project object on the image of the scene;

a classification module configured to classify the material illustration of the project object according to one or more technical or pre-specified color spaces;

a paint mixing device configured to produce a mixed paint having a color based on the classification; and a spraying unit comprising at least one paint container for storing paint to be sprayed, wherein the at least one paint container is filled with the mixed paint having the color based on the classification.

10. The paint spraying device as claimed in claim 9, wherein the at least one paint container is formed as a single-use container.

11. The paint spraying device as claimed in claim 9, wherein the at least one paint container is formed as a single-use cartridge, the cartridge comprising at least one paint line and an atomizer nozzle.

12. The paint spraying device as claimed in claim 9, wherein the at least one paint container is formed as a multi-use container.

13. The paint spraying device as claimed in claim 9, wherein the at least one paint container is formed as a multi-use cartridge comprising at least one paint line and an atomizer nozzle.

14. The paint spraying device as claimed in claim 9, wherein the spraying unit comprises a project identification and/or object identification, and wherein a control statement for the spraying unit comprises a functional approval for the spraying unit to perform a spraying operation based on the project identification and/or the object identification.

15. The paint spraying device as claimed in claim 9, and further comprising a control statement configured to control the spraying unit to perform a a spraying operation, wherein the spraying operation includes applying the mixed paint on a surface, and wherein the spraying operation further includes controlling at least one of: spraying volume, spraying pulses, spraying pressure, or physical spraying parameters.

16. The paint spraying device as claimed in claim 9, wherein the spraying unit is a hand-held spraying unit.

17. The paint spraying device as claimed in claim 9, wherein the paint spraying device comprises a mobile energy source.

18. The paint spraying device as claimed in claim 9, wherein the paint spraying device operates on the basis of an HVLP process for paint application.

19. A paint spraying device comprising:

a mobile digital terminal including a camera configured to capture an image of a project object;

an interface generated by the mobile digital terminal, the interface configured to generate a material illustration of the project object;

a classification module configured to classify the material illustration according to one or more technical or pre-specified color spaces;

a control unit configured to determine, from the classification, a project identification tag corresponding to the material illustration of the project object, a paint container comprising a container identification tag, wherein the container identification tag is associated with the project identification tag, and wherein the container identification tag is configured to be used to assign a control statement for a paint mixing device to the paint container.

20. The paint spraying device as claimed in claim 19, wherein the one or more technical or pre-specified color spaces comprise:

at least one of PANTONE or RAL.

* * * * *